United States Patent [19]
Miller et al.

[11] Patent Number: 5,517,415
[45] Date of Patent: May 14, 1996

[54] METHOD AND APPARATUS FOR DETECTING A MOTOR STALL CONDITION IN AN ELECTRIC ASSIST STEERING SYSTEM

[75] Inventors: Joseph D. Miller, Farmington Hills; William C. Fennessy, Sterling Heights, both of Mich.; Ivan J. Williams, Rolling Hills, Calif.

[73] Assignee: TRW Inc., Lyndhurst, Ohio

[21] Appl. No.: 329,629

[22] Filed: Oct. 26, 1994

[51] Int. Cl.⁶ ...................................... B62D 5/04
[52] U.S. Cl. ...................... 364/424.05; 180/79.1
[58] Field of Search .................. 364/424.05, 483, 364/486; 318/599; 180/79.1; 74/388 PS; 361/31

[56] References Cited

U.S. PATENT DOCUMENTS

| | | | |
|---|---|---|---|
| 4,532,567 | 7/1985 | Kade | 361/31 |
| 4,834,201 | 5/1989 | Miyazaki et al. | 180/79.1 |
| 4,878,004 | 10/1989 | Shimizu | 318/599 |
| 4,918,744 | 4/1990 | Shimizu | 388/833 |
| 4,940,107 | 7/1990 | Hanisko | 180/142 |
| 4,961,033 | 10/1990 | Hirota | 318/560 |
| 4,961,474 | 10/1990 | Daido et al. | 180/79.1 |
| 4,977,507 | 12/1990 | Matsuoka et al. | 364/424.05 |
| 5,040,630 | 8/1991 | Morishita et al. | 180/79.1 |
| 5,097,918 | 3/1992 | Daido et al. | 180/79.1 |
| 5,194,794 | 3/1993 | Shamoto | 318/603 |
| 5,198,981 | 3/1993 | Collier-Hallman et al. | 364/424.05 |

*Primary Examiner*—Michael Zanelli
*Attorney, Agent, or Firm*—Tarolli, Sundheim, Covell, Tummino & Szabo

[57] ABSTRACT

A vehicle electric assist steering system (10) includes a stall detector (70) for detecting a stall condition of a variable reluctance electric motor (26). The stall detector (70) monitors a torque command signal (48) which is responsive to steering torque applied by the vehicle operator to the vehicle steering wheel (12). The stall detector (70) also monitors a commutation sensor (74) which indicates motor commutation. The stall detector (70) determines the existence of a stall condition in response to the torque command signal (48) greater than a predetermined value and no motor commutation. The stall detector (70) controls the gain of an adjustable gain amplifier (52). The adjustable gain amplifier (52) controls current applied to the motor (26). The current applied to the motor (26) is limited when the stall detector (70) detects a stall condition. An Over-use detector (70) determines the existence of an over-use condition by integrating the torque command signal (48).

22 Claims, 3 Drawing Sheets

METHOD AND APPARATUS FOR DETECTING A MOTOR STALL CONDITION IN AN ELECTRIC ASSIST STEERING SYSTEM

BACKGROUND OF THE INVENTION

1. Field of the Invention

The present invention is directed to an electric assist steering system, and specifically directed to a method and apparatus for detecting a motor stall condition in an electric assist steering system.

2. Description of Related Art

Electric assist steering systems are well known in the art. In such electric assist steering systems, an electric assist motor, when energized, provides torque assist to aid the driver in turning steerable wheels of the vehicle. The electric assist motor is typically controlled in response to both steering torque applied to the vehicle steering wheel and measured vehicle speed. A controller monitors steering torque and controls a drive circuit to, in turn, control current applied to the electric assist motor. Such drive circuits typically include FET's (field effect transistors) or other forms of solid state switches operatively coupled between the vehicle battery and the electric assist motor. Current is controlled by pulse width modulation of the FET's or switches. If steering torque is applied and the steerable wheels are held immovable, e.g., the wheels are against a curb, the temperature of both the electric assist motor and the FET's rise. Such a condition is referred to as a stall condition of the electric assist motor. If the stall condition lasts for an extend period, the motor and/or FET's can overheat and fail.

U.S. Pat. No. 4,532,567 to Kade discloses an electric assist steering system which measures actual current through the motor. If the measured current exceeds a limit, the motor drive current is reduced.

U.S. Pat. No. 5,097,918 to Daido et al. discloses an electric assist steering system that includes an electric assist motor connected to a steering mechanism through an electromagnetic clutch. The system further includes a sensor for sensing rotational motion of the electric assist motor. When torque is sensed and the rotary sensor indicates that the motor is not rotating, the system disengages the electromagnetic clutch.

U.S. Pat. No. 4,878,004 to Shimizu discloses an electric assist steering system that includes an electric assist motor and a controller for controlling operation of the motor. The system further includes a current sensor which senses the magnitude of the actual current through the electric assist motor. An average value motor current is determined. The motor is controlled in response to the determined average current value.

SUMMARY OF THE INVENTION

The present invention provides a method and apparatus for detecting a stall condition of an electric assist steering system motor. When a stall condition is sensed, motor current is controlled to prevent damage to both the motor and drive circuitry used to energize the motor.

An apparatus, in accordance with the present invention, includes steering means for steering steerable wheels of the vehicle, said steering means being responsive to steering torque applied to a steering wheel of the vehicle. The electric assist motor is operatively coupled to the steering means for, when energized, providing steering assist. A torque sensor senses the applied steering torque and provides an applied steering torque signal indicative thereof. Control means monitors the applied steering torque signal and provides a torque command signal in response thereto. The electric assist motor is energized in response to the torque command signal. Motor commutation sensing means senses commutation of the electric assist motor and provides a signal indicative thereof. Stall detection means monitors the torque command signal and the motor commutation signal and provides a stall signal in response to the torque command signal and the motor commutation signal.

A method, in accordance with the present invention, for detecting a stall condition of a motor in an electric assist steering system comprises the steps of providing a steering means for steering the steerable wheels of a vehicle, providing an electric assist motor connected to the steering means for, when energized, providing steering assist, sensing the steering torque applied to a steering wheel of the vehicle and providing an applied steering torque signal indicative thereof, monitoring the applied torque signal and providing a torque command signal to the motor to cause the motor in response to the torque signal to develop a steering assist force, sensing commutation of the motor and providing a commutation signal indicative thereof, monitoring the torque command signal and the commutation signals, and providing a stall signal in response to both the torque command signal and the commutation signal.

BRIEF DESCRIPTION OF THE DRAWINGS

Other features and advantages of the present invention will become apparent to those skilled in the art to which the present invention relates from a reading of the following detailed description with reference to the accompanying drawings, in which.

DETAILED DESCRIPTION

Figure 1:
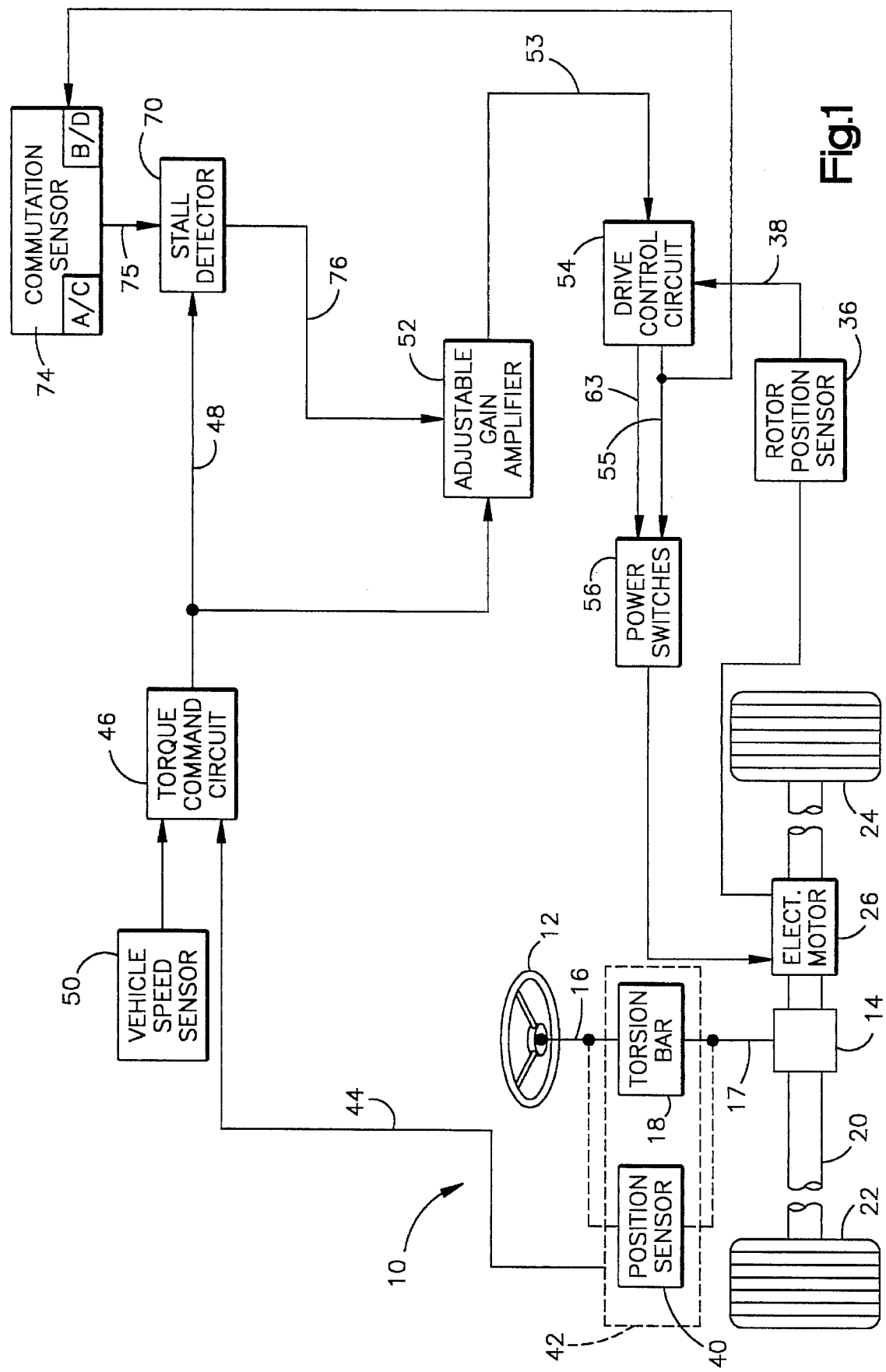
FIG. 1 is a block diagram illustrating an electric assist steering system made in accordance with the present invention.

Referring to FIG. 1, a vehicle electric assist steering system 10, in accordance with the present invention, includes a vehicle steering wheel 12 connected to an input shaft 16 and a pinion gear 14 connected to a pinion shaft 17. The input shaft 16 is coupled to the pinion shaft 17 through a torsion bar 18. The torsion bar 18 twists in response to torque applied to the vehicle steering wheel 12 to permit relative rotation between the input shaft 16 and the pinion shaft 17. Stops, not shown, limit the amount of relative rotation between the input shaft 16 and the output pinion 17 in a manner known in the art.

The pinion gear 14 has a set of helical gear teeth (not shown) which are meshingly engaged with a set of straight cut gear teeth (not shown) on a linear steering member or rack 20. The rack 20 is coupled to vehicle steerable wheels 22, 24 with steering linkage in a known manner. The pinion gear 14 together with the rack 20 forms a rack and pinion gear set. When the steering wheel 12 is turned, the rack and pinion gear set converts the rotary motion of the steering wheel into linear motion of the rack 20. When the rack 20 moves linearly, the steerable wheels 22, 24 pivot about their associated steering axis and the vehicle is steered.

An electric assist motor 26 is drivingly connected with the rack 20 through, preferably, a ball-nut drive arrangement (not shown). The motor 26, when energized, provides assist to aid in steering movement of the rack 20. In a preferred embodiment of the present invention, the motor 26 is a variable reluctance motor. A variable reluctance motor is preferred because of its small size, low friction, and high torque-to-inertia ratio.

Figure 2:
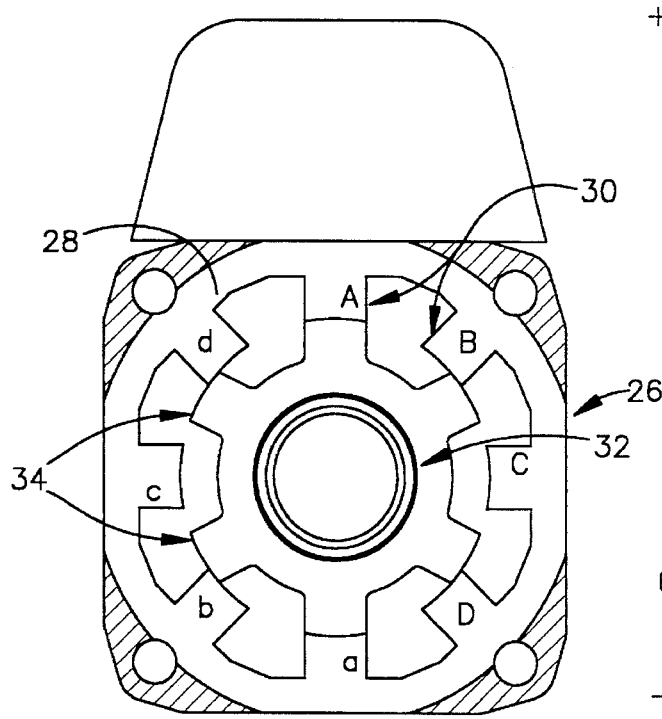
FIG. 2 is a cross-sectional view of the electric assist motor shown in FIG. 1.

The motor 26 includes a stator 28 (FIG. 2) having a plurality of stator poles 30. Associated with each stator pole 30 is a stator coil (not shown) wrapped around the stator pole. The motor 26 also includes a rotor 32 having a plurality of rotor poles 34. In the preferred embodiment, the motor 26 includes eight stator poles 30 and six rotor poles 34.

The stator poles 30 are arranged so as to be energized in pairs designated Aa, Bb, Cc, and Dd. When a pair of stator poles 30 is energized, the rotor 32 moves so as to minimize the reluctance between the energized stator poles and the rotor poles 34. Minimum reluctance occurs when a pair of rotor poles 34 is aligned with the energized stator poles 30. For example, in the position of the motor 26 illustrated in FIG. 2, there is minimum reluctance between the pair of stator poles Aa and the rotor poles 34 which are aligned with the stator poles Aa. Once minimum reluctance is achieved, as determined by the relative position of the rotor and stator, the energized stator poles 30 are de-energized and an adjacent pair of stator poles is energized to continue to cause rotation of the rotor 32.

The direction of rotation of the rotor 32 is controlled by the sequence in which the stator poles 30 are energized. For example, to rotate the rotor 32 clockwise from its position in FIG. 2, the stator pole pair Dd is next energized. To rotate the rotor 32 counterclockwise from the position illustrated in FIG. 2, the stator pole pair Bb is next energized.

The torque produced by the motor 26 is controlled by the amount of current through the stator coils. A preferred manner for controlling a variable reluctance motor so as to control motor torque and direction is fully disclosed in U.S. Pat. No. 5,257,828 to Miller et al., and assigned to TRW Inc., the disclosure of which is fully incorporated herein by reference.

A rotor position sensor 36 (FIG. 1) senses the position of the rotor 32 relative to the stator 28 and provides a rotor position signal 38 indicative of that relative position. In the preferred embodiment, the rotor position sensor 36 is a discrete sensor. It is contemplated that, alternatively, operating parameters of the motor 26 can be used to sense rotor position. For example, rotor position can be determined by monitoring the current through the stator coils associated with unenergized stator poles 30. One specific arrangement for sensing rotor position without a discrete sensor is disclosed in U.S. Pat. No. 5,072,166, the disclosure of which is incorporated herein by reference.

Referring back to FIG. 1, a shaft position sensor 40 is connected with the input shaft 16 and the output shaft 17. The shaft position sensor 40 in combination with the torsion bar 18 forms a torque sensor indicated schematically at 42. The shaft position sensor 40 provides a signal 44 indicative of the relative rotational position between the input shaft 16 and the output shaft 17. The relative rotational position between the input shaft 16 and the output shaft 17 is indicative of the steering torque applied by the vehicle operator to the vehicle steering wheel 12. Therefore, the output signal 44 of the shaft position sensor 40 is indicative of the steering torque applied to the vehicle steering wheel 12 and is referred to as the applied steering torque signal.

The applied steering torque signal 44 is connected to a torque command circuit 46. The torque command circuit 46 determines the assist torque desired from the motor 26. The assist torque determined by the torque command circuit 46 is a function of two parameters: (i) the value of the applied steering torque signal 44, and (ii) vehicle speed. A vehicle speed sensor 50 provides a vehicle speed signal to the torque command circuit 46 indicative of the vehicle speed. Typically, the amount of torque assist desired from the motor 26 decreases as vehicle speed increases. This is referred to in the art as "speed foldback."

The torque command circuit 46 provides a torque command signal 48 indicative of the torque assist value which is desired from the assist motor 26. The torque command signal 48 is output to an adjustable gain amplifier 52. The adjustable gain amplifier 52 amplifies the torque command signal 48 and outputs an amplified torque command signal 53.

The amplified torque command signal 53 is connected to a drive control circuit 54. Preferably, the drive control circuit 54 is a microprocessor or microcomputer. The rotor position signal 38 is also connected to the drive control circuit 54. The drive control circuit 54 utilizes the amplified torque command signal 53 and the rotor position signal 38 to determine the required motor energization current and motor energization sequence to achieve the requested steering direction. The drive control circuit 54 outputs a motor control signal 55. The motor control signal 55 controls which stator pole pair (i.e., Aa, Bb, Cc, or Dd) or pairs are energized and also controls the energization current. Although a single control line 55 is shown, each pole pair has its own associated control line 55, i.e., there are four control lines 55 between the drive control circuit 54 and the power switches 56.

The power switches 56 are pulse width modulated to control the motor current. To ensure smooth operation of the motor 26, the position of the rotor 30 can be estimated at predetermined times between actual rotor position measurements. This estimation is made on the basis of certain known conditions and certain assumptions. Suitable methods of rotor position estimation are described in an IEEE paper entitled "A Simple Motion Estimator For VR Motors" by W. D. Harris and J. H. Lang, IEEE Industry Applications Society Annual Meeting, October 1988 and in a paper entitled "A State Observer for Variable Reluctance Motors: Analysis and Experiments" by A. Lumsdaine, J. H. Lang, and M. J. Balas, 19th ASILOMAR Conference on Circuits, Systems & Computers, November 6–8, 1985. The disclosures of both of these papers are incorporated herein by reference.

Figure 3:
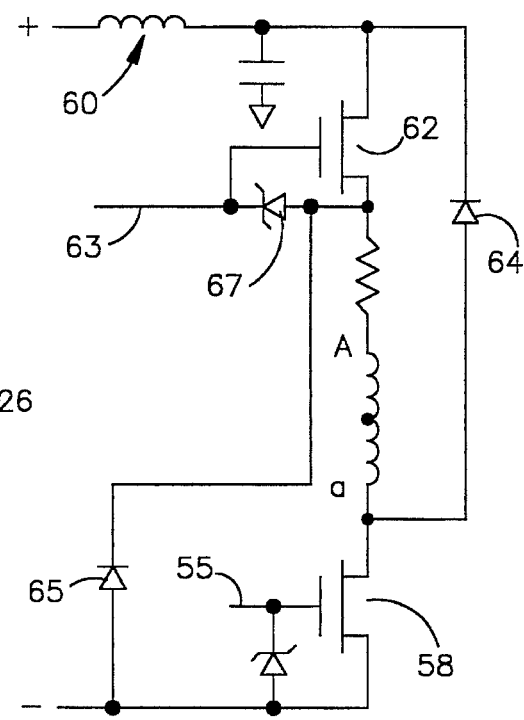
FIG. 3 is a circuit schematic diagram of a portion of the switch shown in FIG. 1.

Referring to FIG. 3, the switch 56 associated with one stator coil pair Aa is shown. One side of the stator coil Aa is connected to electrical ground through a main drive switch 58. The other side of the stator coil Aa is connected to the vehicle battery through a switch 62 and an LC filter network 60. The drive control circuit 54 (FIG. 1) outputs the motor control signals 55, 63 to the control terminal of the switch 58 and switch 62, respectively. The motor control signals 55 and 63 are pulse width modulated by the drive control circuit 54 to control the current through the stator coil pair Aa. Diodes 64, 65 provide fly-back current control. Zener diodes 66, 67 provide over voltage protection.

The motor 26 is energized through the switches 56 to cause the rotor 32 to rotate in the desired direction with the desired torque. Rotation of the rotor 32 results in linear movement of the rack 20. Linear movement of the rack 20 results in turning of the vehicle steerable wheels 22, 24 to steer the vehicle.

To detect a motor stall condition for the purpose of preventing overheating of the motor 26 or the solid state switches 58 in the switch circuit 56, the system 10 includes a stall detector 70. The stall detector 70 uses, in accordance with one embodiment of the present invention, two parameters in determining whether the motor 26 is in a stall condition. The first parameter is the value of the torque command signal 48. When the torque command signal 48, which is indicative of the assist torque desired from the motor 26, is less than a threshold value Tmin, the amount of torque desired from the motor is between zero and a relatively small value. If the current through the motor is less than a predetermined amount, damage to either the switches 58 or motor 26 is not possible. Therefore, in such a case, the stall detector 70 determines that a stall condition can not exist. When the stall detector 70 determines that the torque command signal 48 is greater than the threshold Tmin, a stall condition may exist. In such a case, the stall detector 70 considers the second parameter.

The second parameter used by the stall detector 70 in detecting a motor stall condition is (i) whether or not the motor is commutating and (ii) the duration between commutation.

Commutation occurs when the drive control circuit 54 changes the motor poles that are energized. If one pole pair is energized for greater than a predetermined time period and energization of another pole pair does not occur within that time period, no motor commutation is occurring.

A commutation sensor 74 is connected to each of the outputs 55 of the drive control circuit 54 and to the stall detector circuit 70. The outputs of the drive control circuit 55 indicates to the commutation sensor 74 which stator pole pair or pairs are energized. The commutation sensor 74 monitors the motor control signals 55 and uses these signals to determine the duration for which a stator pole pair or pairs is energized. The commutation sensor 74 includes two timers, designated A/C and B/D. The A/C timer measures the time period for which the stator pole pairs Aa or Cc are energized. The B/D timer measures the time period for which the stator pole pairs Bb or Dd are energized.

For example, when the motor control signal 55 indicates that the stator pole pair Aa is energized, the A/C timer begins measuring the time period for which the stator pole pair Aa remains energized. The A/C timer continues measuring until the stator pole pair Aa is deenergized. The commutation sensor 74 outputs a commutation signal 75 to stall detector 70 having a value indicative of the time period for which the stator pole pair Aa has been energized. If two stator pole pairs are energized simultaneously (e.g., Aa and Bb, or Aa and Dd), the commutation sensor outputs signals to the stall detector 70 indicating which stator pole pairs are energized and the time period of energization of each stator pole pair, i.e., both timers A/C and B/D would be counting or measuring.

In a variable reluctance motor, it is possible to simultaneously energize adjacent pole pairs. Such an approach reduces torque ripple. However, pole pairs Aa and Cc are never energized together and pole pairs Bb and Dd are never energized together. Therefore, the commutation sensor 74 only requires two timers.

The stall detector 70 monitors the commutation signal 75 to determine the period of time for which a stator pole pair is energized. The stall detector 70 determines whether the same stator pole pair or pairs have been energized for greater than a predetermined period of time. If the determination is affirmative, it is determined that no motor commutation is occurring.

If the stall detector 70 determines that both (i) the same stator pole pair or pairs has been energized for greater than the predetermined time, and (ii) the torque command signal is greater than the threshold Tmin, then a stall condition exists. When the stall detector 70 determines a stall condition exists, it outputs a control signal 76 to the adjustable gain amplifier 52 to adjust the gain of the adjustable gain amplifier so as to protect the motor 26 and the switches 56.

The gain of the adjustable gain amplifier 52, in accordance with one embodiment of the present invention, can be set to one of three values: (1) a minimum gain $G_{min}$; (2) an intermediate gain $G_{int}$; and (3) a normal gain $G_{norm}$. When the gain of the adjustable gain amplifier 52 is at the minimum gain level $G_{min}$, the gain of the adjustable gain amplifier 52 is low, to minimize the current to the motor 26 and, thus, minimize the possibility of overheating of the motor and switches 56. When the gain of the adjustable gain amplifier 52 is at the intermediate gain level $G_{int}$, the drive control circuit 54 provides an intermediate amount of current to the motor 26. When the gain of the adjustable gain amplifier 52 is at the normal gain level $G_{norm}$, the gain of the adjustable gain amplifier 52 is greatest, and the drive control circuit 54 can provide a desired amount of current to the motor 26. In this way, when a stall condition is determined to exist, the stall detector 70 can limit the torque demanded from the motor 26 to prevent motor damage and damage to the switches 56.

Figure 4:
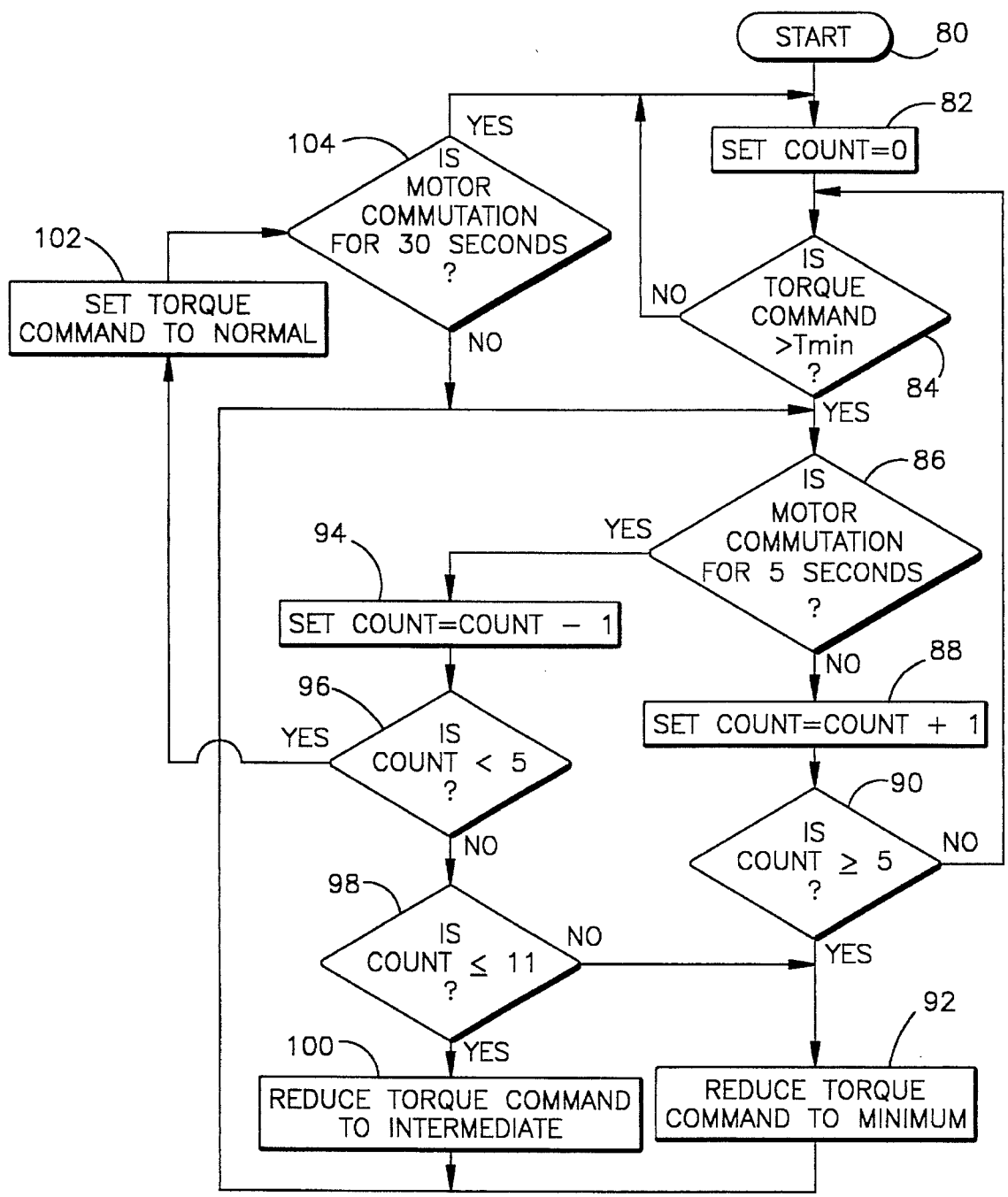
FIG. 4 is a flowchart showing a stall detection process for use with the system of FIG. 1.

Referring to FIG. 4, the control process executed by the stall detector 70 in detecting a motor stall condition will be appreciated. Preferably, the functions of the torque command circuit 46, the drive control circuit 54, the stall detector 70, the commutation sensor 74, and the adjustable gain amplifier 52 are all embodied in a microcomputer. In step 80, the process starts and internal memories, flags, initial conditions, etc., are set to initial values. The process then proceeds to step 82 where an internal counter is initialized to zero. From step 82, the process goes to step 84. In step 84, it is determined whether the value of the torque command signal 48 is greater than the threshold Tmin. If the determination in step 84 is negative, the process loops back to step 82. In this way, the remaining steps of the process are executed only when the value of the torque command signal exceeds the threshold Tmin.

When the determination in step 84 is affirmative, the process proceeds to step 86. In step 86, it is determined whether the commutation sensor 70 indicates that the electric assist motor 26 has been commutating within the last 5 seconds. If the determination in step 86 is negative, indicative of the possibility of the existence of a stall condition, the process proceeds to step 88. In step 88, the counter is incremented by one and the process proceeds to step 90.

In step 90, a determination is made as to whether the count of the counter is greater than or equal to five. If the determination in step 90 is negative, that is, if there has been motor commutation within the last 25 seconds, the process loops back to step 84.

If the determination in step 90 is positive, that is, there has been no motor commutation within the last 25 seconds, then the process proceeds to step 92. In step 92, the gain of the adjustable gain amplifier 52 is set at the minimum gain $G_{min}$ to protect the motor 26 and switches 56. From step 92, the process loops back to step 86.

The current is reduced in step 92 only after the count determined in step 90 is greater than or equal to 5. Each time the motor 26 has not commutated within a 5 second period, the counter in step 88 is incremented. Thus, when the torque command signal 48 exceeds the threshold Tmin and the motor 26 has not commutated within 25 seconds, the stall detector 70 determines that a motor stall condition exists and reduces the gain of the amplifier 52 to a minimum to protect the motor 26 and switches 56.

When the determination in step 86 is affirmative, that is, when the commutation sensor 70 indicates that the motor has commutated within the last 5 second period, the process goes to step 94. In step 94, the counter is decremented by one. The counter value can not be less than zero, i.e., if the counter is at zero, no further decrementing occurs. From step 94, the process proceeds to step 96. In step 96, it is determined whether the count of the counter is less than 5.

If the determination in step 96 is negative, that is, when the count is not less than 5, the process proceeds to step 98. In step 98, a determination is made whether the count is less than or equal to 11. When the determination in step 98 is negative, the process proceeds to step 92 and the gain of the amplifier 52 is maintained at the minimum to keep the motor current at a minimum value. If the count is less than or equal to 11, however, the determination in step 98 is affirmative and the process proceeds to step 100. In step 100, the gain of the amplifier 52 is set to the intermediate gain level $G_{int}$. From step 100, the process loops back to step 86.

The effect of steps 96 and 98 is that after a stall is detected and the gain of the amplifier 52 is reduced to a minimum, the amplifier gain is eventually set or raised to an intermediate level after a sufficient period of time of motor commutation. The gain of the amplifier 52 can remain at the intermediate value for 35 seconds, which corresponds to the counter being decremented from 11 to 5.

If the determination in step 96 is positive, that is, when the count is less than 5, the process proceeds from step 96 to step 102. In step 102, the gain of the adjustable gain amplifier 52 is set to the normal gain level $G_{norm}$. From step 102, the process proceeds to step 104. In step 104, it is determined whether the electric assist motor 26 has been commutating for 30 seconds. If it is determined that the motor 26 has been commutating for 30 seconds, it is assumed that the motor 26 and switches 56 are at or below an acceptable temperature value. If the determination in step 104 is positive, the process loops back to step 82. If the determination in step 104 is negative, it is assumed that the motor 26 and switches 56 may still be at an elevated temperature and so the process returns to step 86.

This control arrangement does not fully remove steering assist, but controls the assist level to protect the motor 26 and switches 56. While a no commutation event increases the count value, a resumption of commutation reduces the value of the count so that at some point in time, normal assist resumes.

The time duration and count values used in the control process shown in FIG. 4 may be varied or tailored for a specific vehicle type and motor arrangement. The time durations and count values are selected for explanation purposes only and are not meant to limit the present invention.

Figure 5:
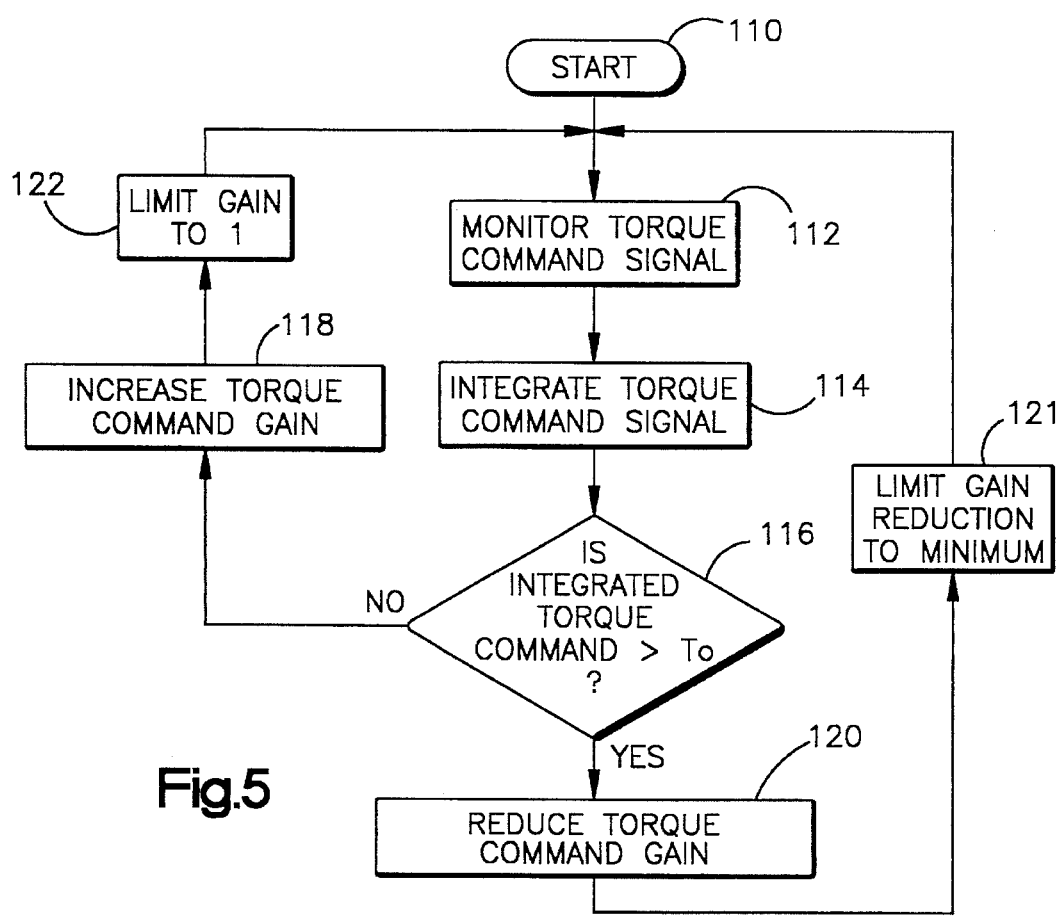
FIG. 5 is a flowchart showing an alternative stall detection process for use with the system of FIG. 1.

An alternative control process for the stall detector 70 is shown in the flowchart of FIG. 5. The control process begins in step 110 where initial parameters are set including setting the initial gain value for the torque command signal equal to 1. The process then proceeds to step 112 where the torque command signal 48 is monitored by the stall detector 70. From step 112, the process proceeds to step 114 where the monitored torque command signal 48 is integrated by a leaky stall detect integrator. To achieve leaky integration, a constant value is subtracted from the integration value each time the process goes through a loop, i.e., each time step 114 is performed.

The process then proceeds to step 116. In step 116, a determination is made whether the integrated torque command signal is greater than a threshold value To. If the determination in step 116 is negative, the process proceeds to step 118 where the gain of the adjustable gain amplifier 52 is increased. The process then proceeds to step 122 where the torque command gain is limited to a value of 1. The process then loops back to step 112.

When the determination in step 116 is affirmative, the process determines that the motor 26 is stalled. The process then proceeds to step 120. In step 120, the stall detector 70 reduces the gain of the adjustable gain amplifier 52. The process then proceeds to step 121 where the gain reduction is limited to a predetermined minimum value. From step 121, the process loops back to step 112. The control process increases the amplifier gain over time to a normal level only when the integrated torque command remains less than the threshold $T_o$ as a result of the integrator leakage over a sufficient time period. It should be appreciated by those skilled in the art that the rate of increase of the torque command gain in step 118 and the rate of decrease of torque command gain in step 120 are independent of each other. Also, the rates may be linear or non-linear.

Those skilled in the art should also appreciate that the embodiment of FIG. 5 detects over-use of the electric assist steering system. Such over-use occurs, for example, when high motor torques are commanded for an extended period of time even though the motor is moving. Those skilled in the art will appreciate that a stall condition may be an over-use condition.

The control processes shown in FIGS. 4 and 5 could be implemented in a single stall and over-use detector 70. In such an implementation, the stall and over-use detector 70 would determine that a stall or over-use condition exists when either or both of the two processes indicates the existence of a stall or over-use condition. In effect, a stall condition is detected as the result of a torque command being greater than a threshold value and no motor commutation for a predetermined time period and an over-use condition is the result of the integrated torque command exceeding a threshold value.

It is desirable to include self-diagnostic features in the drive control circuit to insure proper operation of the assist arrangement. Such a diagnostic arrangement for an electric assist steering system is fully described in U.S. Pat. No. 4,660,671, to Behr et al., and assigned to TRW Inc., the disclosure of which is hereby incorporated herein by reference.

From the above description of preferred embodiments of the invention, those skilled in the art will perceive improvements, changes and modifications in the invention. Such improvements, changes and modifications within the skill of the art are intended to be covered by the appended claims.

Having described the invention, I claim the following:

1. An apparatus for detecting a stall condition of an electric assist motor in a vehicle electric assist steering system, comprising:

steering means for steering steerable wheels of the vehicle, said steering means being responsive to steering torque applied to a steering wheel of the vehicle, the electric assist motor being operatively coupled to the steering means for, when energized, providing steering assist;

a torque sensor for sensing applied steering torque and for providing an applied steering torque signal indicative thereof;

control means for monitoring said applied steering torque signal and for providing a torque command signal in response thereto, said electric assist motor being energized in response to said torque demand signal;

motor commutation sensing means for sensing commutation of said electric assist motor and for providing a signal indicative thereof; and stall detection means for monitoring said torque command signal and said motor commutation signal and for providing a stall signal in response to said torque command signal and said motor commutation signal.

2. The apparatus of claim 1 wherein said stall detection means includes means for providing said stall signal when both (a) said torque command signal exceeds a predetermined threshold and (b) said commutation sensing means indicates said motor is not commutating.

3. The apparatus of claim 2 wherein said electric assist motor is a variable reluctance motor including a stator having a plurality of stator poles, each one of said stator poles having an associated winding for energization of its associated stator pole, and said motor commutation sensing means includes means for sensing a change in the energization of stator poles.

4. The apparatus of claim 2 further including means for adjusting the value of said torque command signal and wherein said stall detection means includes means for controlling said adjusting means.

5. The apparatus of claim 4 wherein said stall detection means includes means for setting the level of said torque command signal to a first level when said stall signal indicates the existence of a stall condition for a first predetermined time period.

6. The apparatus of claim 5 wherein said stall detection means includes means for setting the level of torque command signal to a second level after resumption of commutation is sensed.

7. The apparatus of claim 6 wherein said stall detection means includes means for returning the level of said torque command signal to an unadjusted level when said stall signal indicates that said motor has been commutating for a predetermined period of time.

8. The apparatus of claim 1 wherein said control means includes means for integrating said torque command signal over time and for providing an integrated torque command signal, and wherein said stall detection means includes means for also providing said stall signal in response to said integrated torque command signal.

9. The apparatus of claim 8 wherein said stall detection means includes means for providing said stall signal when at least one of (a) said torque command signal exceeds a predetermined threshold and said commutation sensing means indicates there is no motor commutation and (b) said integrated torque command signal exceeds a predetermined threshold.

10. An apparatus for detecting an over-use condition of an electric assist motor in a vehicle electric assist steering system, comprising:

steering means for steering the steerable wheels of a vehicle;

torque command circuit means for sensing the steering torque applied to the vehicle steering wheel and for providing a torque command signal indicative thereof; and over-use detection means for integrating said torque command signal over time and for providing an overuse signal in response to said integrated torque command signal.

11. The apparatus of claim 10 wherein said over-use detection means includes means for providing said over-use signal when said integrated torque command signal exceeds a predetermined threshold.

12. The apparatus of claim 11 further including a variable gain amplifier means operative between said torque command circuit means and said over-use detection means for controlling the gain of said torque command signal and further including means for decreasing the gain of variable gain amplifier in response to said over-use signal.

13. The apparatus of claim 12 further including means for increasing the gain of said variable gain amplifier when the integrated torque command signal is less than the predetermined threshold.

14. The apparatus of claim 13 wherein said means for decreasing and said means for increasing the gain of said variable gain amplifier have independent rates.

15. A method for detecting a stall condition of a motor in an electric assist steering system, comprising the steps of:

(a) providing a steering means for steering the steerable wheels of a vehicle;

(b) providing an electric assist motor connected to said steering means for, when energized, providing steering assist;

(c) sensing the steering torque applied to a steering wheel of said vehicle and providing an applied torque signal indicative thereof;

(d) monitoring said applied torque signal and providing a torque command signal to said motor in response thereto, said motor being energized in response to said torque command signal;

(e) sensing commutation of said motor and providing a commutation signal indicative thereof;

(f) monitoring said torque command signal and said commutation signals; and (g) providing a stall signal in response to both said torque command signal and said commutation signal.

16. The method of claim 15 wherein said step of providing a stall signal further includes the step of determining when said torque command signal exceeds a predetermined value and providing said stall signal when said torque command signal exceeds said predetermined value and no motor commutation has occurred within a predetermined time period.

17. A method for detecting an over-use condition of an electric assist steering motor, comprising the steps of:

(a) providing a steering means for steering the steerable wheels of the vehicle;

(b) sensing the steering torque applied to a steering wheel of said vehicle;

(c) providing a torque command signal in response to said sensed applied steering torque;

(d) integrating said torque command signal; and (e) providing an over-use signal in response to said integrated torque command signal.

18. The method of claim 17 further including the step of periodically decreasing the value of the integrated torque command signal.

19. The method of claim 18 wherein the step of providing the over-use signal occurs when the value of the integrated torque command signal exceeds a predetermined value and further including the step of decreasing the gain of torque command signal in response to said over-use signal.

20. The method of claim 19 further including increasing the gain of the torque command signal where the integrated torque command signal is less than the predetermined value.

21. An apparatus for detecting a fault condition of an electric assist motor in a vehicle electric assist steering system, comprising:

steering means for steering steerable wheels of the vehicle, said steering means being responsive to steering torque applied to a steering wheel of the vehicle, the electric assist motor being operatively coupled to the steering means for, when energized, providing steering assist;

a torque sensor for sensing applied steering torque and for providing an applied steering torque signal indicative thereof;

control means for monitoring said applied steering torque signal and for providing a torque command signal in response thereto, said electric assist motor being energized in response to said torque demand signal;

motor commutation sensing means for sensing commutation of said electric assist motor and for providing a signal indicative thereof;

stall detection means for monitoring said torque command signal and said motor commutation signal and for providing a stall signal in response to said torque command signal and said motor commutation signal;

over-use detection means for integrating said torque command signal over time and for providing an overuse signal in response to said integrated torque command signal; and means for providing a fault signal in response to either one said stall signal and said over-use signal.

22. A method for detecting a fault condition of a motor in an electric assist steering system, comprising the steps of:

(a) providing a steering means for steering the steerable wheels of a vehicle;

(b) providing an electric assist motor connected to said steering means for, when energized, providing steering assist;

(c) sensing the steering torque applied to a steering wheel of said vehicle and providing an applied torque signal indicative thereof;

(d) monitoring said applied torque signal and providing a torque command signal to said motor in response thereto, said motor being energized in response to said torque command signal;

(e) sensing commutation of said motor and providing a commutation signal indicative thereof;

(f) monitoring said torque command signal and said commutation signals;

(g) providing a stall signal in response to both said torque command signal and said commutation signal.

(h) integrating said torque command signal;

(i) providing an over-use signal in response to said integrated torque command signal; and (j) providing a fault signal in response to either a stall signal or an over-use signal.

* * * * *